UNITED STATES PATENT OFFICE.

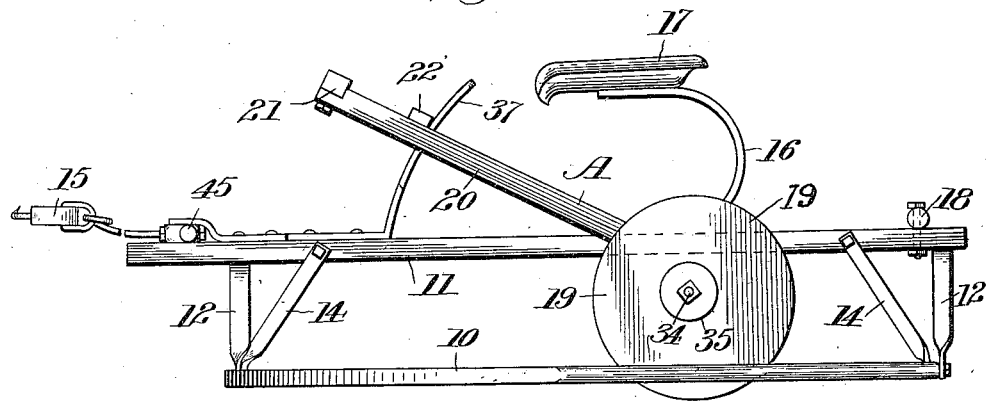
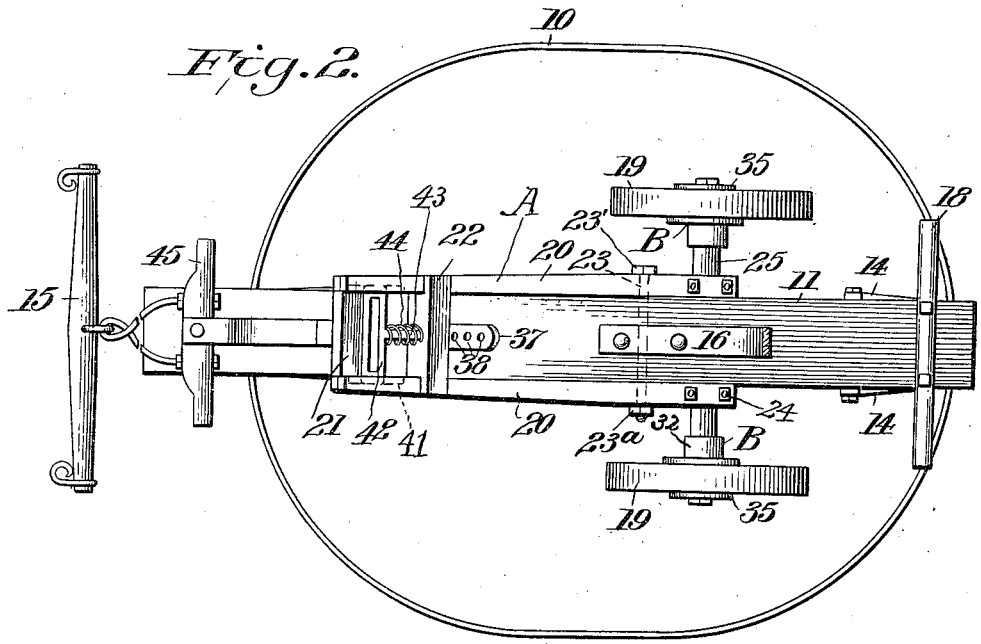

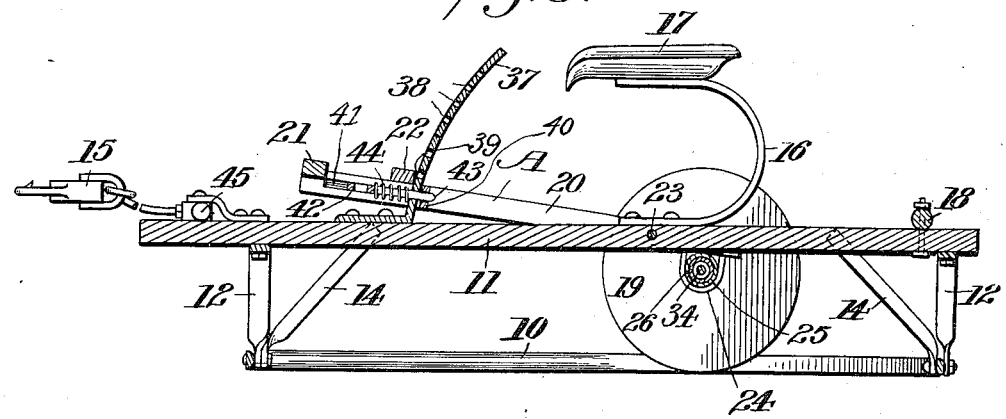

MENNO S. YODER, OF SHIPSHEWANA, INDIANA.

CULTIVATOR.

1,064,585.  Specification of Letters Patent.  Patented June 10, 1913.

Application filed January 6, 1913. Serial No. 740,485.

*To all whom it may concern:*

Be it known that I, MENNO S. YODER, a citizen of the United States, residing at Shipshewana, in the county of Lagrange and State of Indiana, have invented certain new and useful Improvements in Cultivators, of which the following is a specification.

This invention relates to cultivating implements, particularly designed for mulching corn.

At a certain period in the growth of the corn plant it sends or shoots out tiny feeding roots all over the loose soil between the rows of corn for the collection of moisture and plant food and any implement used for cultivation that runs deep into the soil cuts or breaks off a great many of these roots to the injury of the growing crop. Various tools and implements have been used for the purpose of mulching corn, such for instance, as double shovel plows, five shovel cultivators, spring tooth cultivators, spike tooth drags and two horse cultivators. In the use of all of these tools many fine corn roots have been cut off to the injury of the growing crop and it is necessary for the driver to walk and hold the implement steady to do efficient work. This is very laborious and tiresome. Furthermore, the cultivators with shovels also leave the ground in continuous ridges, leaving much surface exposed to the drying influence of the sun and wind and also allow the water to run off from the field as readily as if the ground were left smooth.

It is therefore one object to provide an implement particularly adapted to operate upon the crust formed upon the surface of the ground to break it and thereby provide a dust mulch to conserve the moisture for the use of the corn plants and thereby destroy small weeds and not cut so deeply into the soil as to injure the corn roots.

Another object resides in the provision of a corn mulcher implement so constructed and operable in such a way as to permit its use for the making of dust mulch up to the time the crop is almost matured.

Another object is to provide a cultivating implement particularly adapted to form a dust mulch or to form a dust mulch and also undulate the ground between rows of corn or other plants with the implement preferably provided with wheels located with such relation to the implement as to cover up the tracks made by the wheels during the formation of the dust mulch.

A still further object is to provide an implement which may or may not be of the wheeled type and which is designed to carry the driver, to destroy small weeds and effect a perfect dust mulch.

It is still further designed to provide an implement of the character described embodying among other characteristics means whereby a dust mulch may be formed and properly distributed between rows of corn or other plants and the formation of shallow depressions made in the surface of the soil to hold the water and give it time to soak into the ground and not run off of the field without making these depressions so deep or so close together as to be objectionable in driving over the ground with a corn binder, wagon or other vehicle or apparatus.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a side elevation. Fig. 2 is a top plan view. Fig. 3 is a longitudinal sectional view of a modified arrangement. Fig. 4 is a rear view of the structure shown in Figs. 1 and 2. Fig. 5 is a detail fragmentary sectional view through one end of the axle and boxing and one of the wheels. Fig. 6 is a face view of one of the wheels illustrating the hub cap secured eccentrically thereto.

Referring now more particularly to the accompanying drawings the reference character 10 indicates the element which operates upon the surface soil to scrape and break or pulverize the soil crust and thereby form a dust mulch and under certain conditions to form undulations in the surface soil between rows of corn, cane, sorghum or Kafir corn or other plants. This surface soil breaking member 10 is preferably oval in shape but it may be perfectly circular in shape if desired. It is preferably secured to a beam or other body member 11 and spaced therefrom through the instrumentality of suitable connections, such for instance, as benches 12 bolted or otherwise secured to the soil crust breaking member 10. If desired, braces 14 may be employed between the members 10 and 11.

Suitable draft appliances 15 may be secured to the forward end of the body member 11 and a support 16 for a seat 17 may be also secured thereto, together with a bar 18 secured in any suitable manner to its rear end and projecting upon opposite sides thereof for grip by the operator of the implement to lift and turn the implement at the ends of the rows.

While I have stated that the surface soil breaking member 10 may be perfectly circular, I preferably form it oval in shape with the same having somewhat peculiar formation. It is preferably formed of a narrow steel strip and preferably semicircular in cross section with the upper and lower edges comparatively sharp. The forward half of this surface soil treating member 10 preferably has its rounded face on the inner side with its flat face on the outer side. The rear half of this member 10 preferably has its rounded surface on the outer side with its flat surface on the inner side. One way in which this member 10 may be formed is to take two strips of steel or other suitable narrow strip material of the same length and bend the same, one with its flat surface on the inner side and one with its flat surface on its outer side. The two members may then be jointed together by a welding or other process to form either an oval or annular crust breaking member.

The implement will do effective work by merely dragging it along the ground. That is to say, the surface soil or crust may be effectively broken or pulverized by dragging the implement between the rows. I prefer, however, to provide a wheeled implement. This may be done in various ways. One way is to provide a single pair of wheels 19 and have these wheels arranged so that they may be raised and lowered with respect to the beam 11. The wheels 19 are preferably of wood but the material of which the wheels are formed is more or less immaterial. As shown, the wheels 19 are carried by a lever A comprising two spaced bars 20 connected at their outer ends by a head 21 and near the head 21 connected by a brace 22. This lever A has its head 21 disposed preferably on its upper side so that the lever may be let down without hurting the operator's fingers and its bars 20 are preferably beveled to lighten the same. The lever preferably straddles the beam 11 and is pivotally connected to the latter preferably by means of a bolt 23 having a head 23′ and a fastening nut 23ª. The lower ends of the members 20 of the lever preferably extend below the beam 11 and terminate above the surface soil breaking member 10.

The lever A has secured to the inner ends of the members 20 in any suitable manner, preferably by means of clamps 24, an axle boxing 25 in which is journaled a hollow axle 26 whose ends project beyond the ends of the boxing. The boxing 25 is provided with apertures 27 through which oil may be fed to lubricate the axle, there being bands 28 to cover the apertures 27 to exclude dust or other foreign matter.

The wheels 19 are each preferably provided with apertures 29 and 29′ and to the inner side of each wheel is secured in any suitable manner a hub B. Each hub B includes a plate 30 provided with prongs 31 that are adapted to bite into the inner side of the corresponding wheel. Each hub plate B has an annular socket 32 provided with an annular shoulder 32′ adapted to be engaged by an end of the boxing 25, the hollow axle 26 fitting in said socket 32 and at each end having a notch 32ª to engage a shoulder 32ᵇ in the socket 32 to insure rotation of both wheels together. Each plate 30 also has extending through it an aperture 33 which leads into the socket 32. Extending through the hollow axle 26 and through the apertures 33 of the plates 30 and also through the apertures 29′ of the wheels 19 is a bolt 34 and by securing washer plates 35 on the ends of the bolt 34 and adjacent the outer faces of the wheels 19 and employing nuts 34′ on the ends of the rod 34, an effective hub connection for the wheels results and the latter are held in proper operative relation to their axle.

The hub plates B are readily disconnected from the inner faces of the wheels and adjustably secured to the inner sides of the wheels so that the peripheries 27 of the hub caps may be positioned adjustably with relation to the apertures 29 and 29′ of the wheels 19. If the hubs B are secured at the center of the wheels and the lever A be positioned as shown in Fig. 3, the wheels 19 will be so positioned that both the front part and the rear part of the surface breaking member will at all times scrape the surface soil, pulverizing it, and forming a dust mulch, forcing part of the mulch to each side of the row to check water and prevent it from running off the field sidewise of the rows and also causing the mulch to be passed over the crust breaking member and left in loose condition between the rows. The crust breaking member 10 is made of a comparatively narrow strip of steel which causes most of the pulverized soil to fall over it and make a good dust mulch. When the hubs are set off the centers of the wheels as shown in Figs. 1, 4, 5 and 6, the rear part of the surface breaking member digs comparatively hard when the small side of the wheels is down and lets more of the dirt or crust lie when the larger side of the wheel is down with the result that the ground gone over is undulated or given a wave-like appearance without forming deep undulations. Thus, upon eccentrically mounting the wheels 19, the implement is given a rocking or wave-like motion with the result that the surface crust is broken and pulverized and part of the loose soil is forced toward the rows to check the water while part of the loose soil passes over the crust-breaking member and undulations are formed between the rows to hold the heavy down pour of rain and permit it to soak into the ground rather than permit the water to run off from the field. The machine is thus capable of performing smooth work or undulating work and has its axle and wheels so mounted that through the instrumentality of a lever the depth of the cut in either the undulating or flat scraping process may be regulated.

To hold the wheels 19 in various adjusted positions I preferably mount in any suitable manner upon the beam 11 a segment 37 provided with a plurality of apertures 38. This segment 37 has slidable engagement in a notch 39 formed in the bars 22 and closed by a plate 40 secured to the under side of the brace 22. The segment 37 thus slides in a slot in the lever A. Slidably mounted in the grooves 41 on the inner sides of the parallel members 20 of the lever A is the gripping part 42 of a bolt 43 slidable in an aperture in the brace 22. Encircling this bolt 43 is a spring 44 designed to force the bolt 43 normally through the brace 22 and into any one of the apertures 38 of the segment 37 according to the desired adjustment of the wheel 19. This lever A is within ready reach of the driver on the seat 17 who may readily grasp the part 42 of the latch and lift the bolt 43 out of an aperture 38 in the segment 37 and permit the bolt to engage in any one of the plurality of apertures in said segment 37 according to the adjustment desired.

The implement is preferably provided with a foot rest 45 and as shown in the accompanying drawings the foot rest 45 and draft appliances are associated together. The operator with his feet is enabled to direct to a small degree the course of travel of the implement when it is drawn by the horse or other animal.

By virtue of the peculiar formation of the crust breaking member the same is readily reversible and it will be noted that the wheels of the implement are arranged inside of this member 10 so that no wheel tracks are apparent in the ground gone over by the implement. The crust breaking member is of such form and construction that there is no danger of cutting off stalks in the event that the same should come in contact with rows of corn.

What is claimed is:—

1. The combination with a wheeled body member, of a substantially oval-shaped soil crust breaking member secured to said body member.

2. The combination with a body member, of a substantially oval-shaped soil crust breaking member secured to said body member.

3. The combination with a wheeled body member, of a substantially oval-shaped soil crust breaking member secured to said body member, the crust breaking member surrounding the wheels of the body member.

4. The combination with a wheeled body member, of a substantially oval-shaped soil crust breaking member secured to said body member, the crust breaking member surrounding the wheels of the body member, and having its upper and lower edges relatively sharp.

5. The combination with a body member, of a substantially oval-shaped soil crust breaking member secured to said body member, the crust breaking member surrounding the wheels of the body member.

6. The combination with a body member, of a substantially oval-shaped soil crust breaking member secured to said body member, the crust breaking member surrounding the wheels of the body member, and having its upper and lower edges relatively sharp.

7. The combination with a wheeled body member, of a comparatively narrow substantially oval-shaped soil crust breaking member secured to said body member, and means for rocking the crust breaking member to undulate the soil.

8. The combination with a wheeled body member, of a crust breaking member surrounding the wheels of the body member, and means to operate the crust breaking member to undulate the soil.

9. The combination with a body member, of a soil crust breaking member carried by the body member, a lever swingingly mounted on the body member, wheels supported from said lever and adjustable thereby to regulate the depth of cut of the crust breaking member, and means to hold the lever in adjusted positions.

10. The combination with a wheeled body member, of a crust breaking member secured to the body member in spaced relation thereto and surrounding the wheels of the body member.

11. The combination with a wheeled body member, of a crust breaking member secured to the body member, and means for rocking the crust breaking member to undulate the soil.

12. The combination with a body member, of a crust breaking member secured to the body member, and means for rocking the crust breaking member to undulate the soil.

13. The combination with a wheeled body member having its wheels mounted eccentrically on the axis of the body member, of a soil crust breaking member secured to said body member.

14. The combination with a wheeled body member having its wheels mounted eccentrically on the axis of the body member, of a soil crust breaking member secured to said body member, and surrounding the wheels of the body member.

15. The combination with a wheeled body member having its wheels mounted eccentrically thereon, of a substantially oval shaped soil crust breaking member secured to said body member.

16. The combination with a wheeled body member, of a reversible soil crust breaking member secured to said body member.

17. The combination with a wheeled body member, of a reversible soil crust breaking member secured to said body member and surrounding the wheels of the body member.

18. The combination with a body member, of a reversible substantially oval-shaped crust breaking member spaced from the body member and having comparatively sharp operating edges.

19. The combination with a body member, of a soil crust breaking member carried by the body member, a lever swingingly mounted on the body member, wheels adjustably supported from said lever, a segment secured to the body member and having apertures therein, and a latch carried by the lever for engagement in the apertures of the segment to interchangeably hold the lever in adjusted positions.

20. The combination with a body member, of a soil crust breaking member carried by the body member, a lever swingingly mounted on the body member, wheels adjustably supported from said lever, a segment secured to the body member and having apertures therein, and a latch carried by the lever for engagement in the apertures of the segment to interchangeably hold the lever in adjusted positions, draft appliances secured to the body member, and a foot rest secured to the body member.

21. The combination with a body member, of a soil crust breaking member connected to the body member and arranged to permit the loosened soil to pass over the crust breaking member.

22. The combination with a body member, of a soil crust breaking member connected to the body member and arranged to permit a portion of the loosened soil to pass over the crust breaking member and to deflect a portion of the broken soil to the side of the implement.

23. The combination with a body member, of a soil crust breaking member connected to the body member and arranged to permit the loosened soil to pass over the crust breaking member beneath the body member.

24. The combination with a body member, of a soil crust breaking member connected to the body member and arranged to permit the loosened soil to pass over the crust breaking member, and means to adjust and gage the depth of cut of the crust breaking member.

25. The combination with a body member, of a soil crust breaking member secured to said body member and surrounding the wheels of the body member and adapted to pulverize the ground and cover the tracks made by the wheels.

In testimony whereof I affix my signature in presence of two witnesses.

MENNO S. YODER.

Witnesses:
CHARLES A. RYLAND,
JONATHAN FARVER.